April 8, 1924.
J. H. MENDENHALL
1,489,645
TOOL FOR REMOVING DUST CAPS FROM PNEUMATIC TIRE VALVES
Filed Feb. 21, 1923
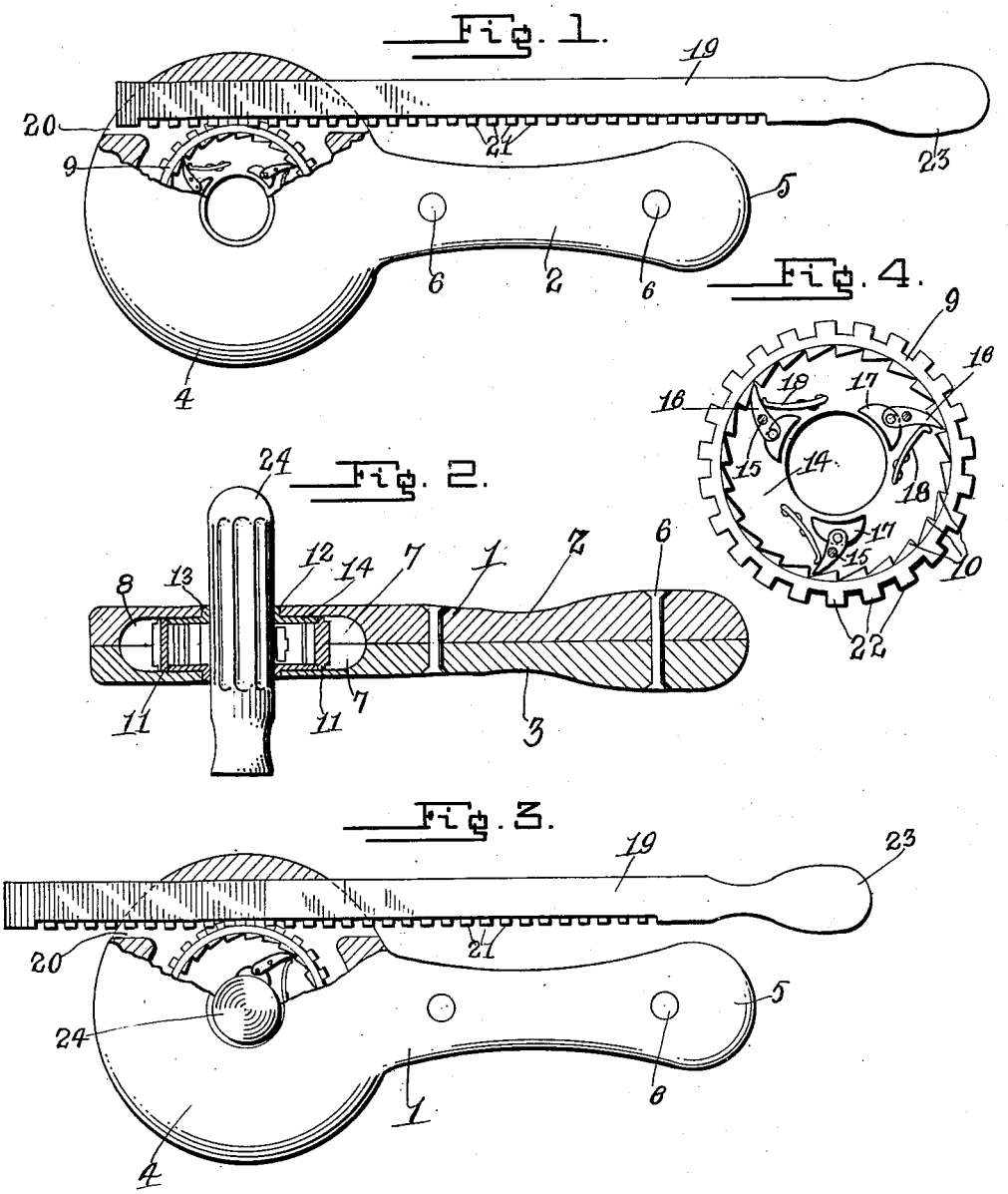
James H. Mendenhall.
Inventor Patented Apr. 8, 1924.

1,489,645

UNITED STATES PATENT OFFICE.

JAMES H. MENDENHALL, OF NOTTINGHAM, PENNSYLVANIA.

TOOL FOR REMOVING DUST CAPS FROM PNEUMATIC-TIRE VALVES.

Application filed February 21, 1923. Serial No. 620,443.

*To all whom it may concern:*

Be it known that I, JAMES H. MENDENHALL, a citizen of the United States, residing at Nottingham, in the county of Chester and State of Pennsylvania, have invented certain new and useful Improvements in Tools for Removing Dust Caps from Pneumatic-Tire Valves, of which the following is a specification.

This invention relates to new and useful improvements in tools and more particularly to tools such as are used for unscrewing dust caps from the valve stems of pneumatic tires. Difficulties have heretofore been experienced in removing the dust cap from the stem of a pneumatic tire valve, due to the fact that after a period of use, considerable mud, grease and the like usually accumulates around the cap and adheres to the cap and portions of the rim of the wheel surrounding the cap.

The primary object of my invention is the provision of a tool of the above character which may be quickly and readily engaged with the dust cap of the tire valve for removing the same from the stem of the valve, and when desiring to replace the dust cap, upon the stem of the valve, the tool can be readily used for screwing the dust cap back into position upon the stem of the valve.

A further object of the invention is the provision of a tool of this character constructed along the lines of a socket tool, wherein the main operating parts of the tool are enclosed within a suitable casing or housing so that the parts are thoroughly protected against unusual wear or breakage.

With the above and other objects in view, the invention consists in the novel features of the construction, the combination and arrangement of parts as pointed out in the appended claims and shown in the accompanying drawings; wherein—

Figure 1 is a side elevation of the tool constructed in accordance with my invention, parts of the same being broken away and illustrated in cross section, Figure 2 is a cross sectional view taken through the tool illustrating the dust cap in position, Figure 3 is a side elevation of the tool, parts being broken away and illustrated in cross section and illustrating the several parts of the tool in their operative position during removal of the cap, Figure 4 is a side elevation of the main operating gear, illustrating the respective positions of the gripping members which engage the dust cap for its removal, and Figure 5 is a detail perspective view of the bearing plates which retain the operating gear in position within the casing.

Referring now more particularly to the drawings wherein the several parts of the device are referred to by various reference characters, it will be noted in the present instance that the body member 1 is formed of two separable sections and I wish it to be understood that should it be so desired the body member may be formed of a single piece, provision being made for inserting the various operating parts into the casing within which they are enclosed. The sections of the body 1 in the present instance are indicated by the numerals 2 and 3, each section including a circumferential body portion 4 and a handle portion 5, said portions being arranged in opposed relation and securely connected together by means of the rivet members 6 extending through the handle of the body.

Each of the circumferential portions 4 are provided with a recess 7, whereby when the two sections of the tool are brought together as illustrated in the drawings, these recesses provide an annular chamber 8, which in connection with the walls of the recesses 7 forming a suitable casing to receive the main operating parts of the tool. Arranged within the chamber 8 is the gear wheel 9, the inner face of which is provided with a plurality of ratchet teeth 10, said ratchet teeth preferably being disposed intermediate the side edges of the inner face of the gear 9 to provide the supporting flanges 11.

The portions 4 are provided with the aligned openings 12 arranged to receive the annular flanges 13 formed upon the bearing plates 14, said bearing plates being arranged upon opposite sides of the gear wheel 9, with the circumferential edges engaged with the flanges 11, thus supporting the gear wheel 9 in concentric relation with the opening in the body member of the tool defined by the annular flanges 13.

Pivotally connected to one of the plates 14 by means of the pins 15 are the pawls 16 which are adapted to cooperate with the ratchet teeth formed upon the inner face of the gear member 9 and pivotally connected to the inner ends of these pawls are the gripping shoes 17, which are disposed in annular formation about the central opening through the body of the tool, the purpose of which will be hereinafter more fully set forth.

In order to retain the pawls 16 in operative engagement with the ratchet teeth 10, suitable leaf springs 18 are provided, one end of each leaf spring being rigidly connected to one of the bearing plates 14, while the loose end of this spring bears against one face of the pawls to yieldably retain the outer ends of said pawls in contact with the ratchet teeth. Attention is called to the fact that when the gear 9 is rotated in one direction, the outer ends of the pawls 16 will contact with the perpendicular faces of the ratchet teeth, tending to oscillate the pawls upon their pivots 15, and move the gripping shoe 17 inwardly toward the opening through the casing, and by reverse movement of the gear wheel 9, the outer ends of the pawls will ride over the inclined faces of the ratchet teeth and tend to move the gripping shoes away from the opening.

In order to impart movement to the gear wheel 9, an operating rack 19 is provided, which is adapted to be reciprocated in the longitudinal opening 20 formed in the circumferential body portion of the tool, said rack being provided upon one face thereof with a plurality of transverse ribs 21 forming teeth adapted to engage the teeth 22 of the gear 9 when the rack is reciprocated through the opening 20 to impart a rotary movement to the gear 9. The rack 19 in the present instance is manually operated, and in order that the operator may readily grasp the end of the rack for reciprocating the same within the opening 20, a suitable handle portion 23 is formed upon the end of the rack opposite the end of the teeth 21, whereby the operator may readily grasp the handle 23 and reciprocate the rack 19 as desired to rotate the gear 9. From the disclosure in Figure 1, it will be noted that when the rack 19 is moved through the opening 20, in a direction away from the operator the gear wheel 9 will be rotated so that the pawls 16 will engage the perpendicular faces of the ratchet teeth 10 and tend to move the gripping shoes 17 inwardly toward the opening through the body of the tool, whereas a reverse movement of the parts will tend to move the shoes 17 away from the opening.

In the operation of my improved tool, the body of the tool is arranged over the dust cap 24 as shown in Figure 2, so that the dust cap extends through the opening in the body defined by the annular flanges 13 of the bearing plates, the operating rack 19 being disposed upon the right hand side of the tool with respect to the operator, the handle 5 being grasped with the left hand of the operator, while the handle 23 is grasped by the right hand of the operator. It will be noted that after the tool has been placed in the above position and the rack 19 reciprocated in a direction away from the operator, the teeth 21, which engage the teeth 22 on the gear wheel 9 will tend to rotate the gear wheel, bringing the perpendicular faces of the ratchet teeth 10 against the outer ends of the pawl 16, tending to move the gripping shoes 17 into gripping engagement with the exterior surface of the dust cap 24, whereby by continual reciprocating movement upon the part of the rack 19 away from the operator, the dust cap 24 will be rotated by the engagement of the shoe 17 therewith, so that the cap may be readily unscrewed from the stem to which it has been applied. It will be noted that the number of teeth upon the supporting rack 19 is sufficient to impart the proper number of revolutions to the gear wheel 9 for causing the gripping shoe 17 to engage the dust cap and impart the number of revolutions to the same for unscrewing it from the stem of the valve. It will be understood, however, that in some instance a large number of screw threads are used in placing the dust cap upon the tire valve, and in this case it is found necessary to reciprocate the rack 19 several times, before the dust cap will be unscrewed from the stem of the valve. It will be noted, however, that when the rack 19 is returned to the operator, the gear wheel is rotated in the opposite direction, so that the outer ends of the pawls readily ride over the inclined faces of the ratchet teeth 10 and move the gripping teeth 17 away from the dust cap so that no reverse movement is imparted to the cap.

In operating my improved tool for replacing the dust cap 24 upon the stem of the valve, the position of the tool is reversed from that disclosed in the drawings so that the handle member 5 of the tool will be arranged upon the right hand side of the operator, while the operating rack 19 is disposed upon the left hand side. It will be noted that when this tool has been applied to the dust cap 24, in the reverse position as set forth above, the operating rack 19 reciprocated to rotate the gear wheel 19, the cap 24 will be threaded onto the stem of the valve, the operation being carried out in the same manner as when the top was removed from the valve.

From the above it will be apparent that applicant has provided an extremely simple tool of the character set forth, which may be quickly and readily applied to the dust cap of a pneumatic tire valve, so that the cap may be quickly and readily removed from the stem of the valve or replaced thereon.

While I have shown and described the preferred form of my invention, it is to be understood that the various changes and alterations are to be carried out without departing from the spirit of the invention or the scope of the appended claims.

I claim:

1. A tool of the class described including a body member having a chamber formed therein and having opposed openings positioned axially of the chamber, a rotatable member within said chamber disposed concentric with the transverse openings, gripping members arranged in annular formation around the transverse openings, pawls pivotally mounted and having their outer ends pivotally connected with said gripping members intermediate the length thereof, ratchet teeth formed on said rotatable member, spring means yieldably holding the outer ends of the pawls in engagement with the ratchet teeth and means for imparting oscillating movement to the rotatable member whereby to move the gripping members toward and away from the openings to the body.

2. A tool of the class described including a body member having a chamber and having an opening disposed axially of the chamber, a rotatable gear wheel in the chamber disposed in concentric relation with the axially disposed opening, gripping members arranged annularly in the chamber, pivoted pawls loosely connected with said gripping members intermediate the lengths of the gripping members, ratchet teeth formed upon the inner face of the gear wheel, yieldable means for moving the outer ends of said pawls into contact with the ratchet teeth, and a reciprocating rack bar engaging the gear to impart a rotary movement thereto whereby to move the gripping members toward and away from the axially disposed opening.

JAMES H. MENDENHALL.